United States Patent Office 3,396,156
Patented Aug. 6, 1968

3,396,156
THE USE OF A COMPLEX OF A CUPROUS HALIDE AND HYDROXYLAMINE FOR THE PREPARATION OF COPPER MERCAPTIDES
Louis Laufer, Bronx, and Bernard W. Town, Mount Vernon, N.Y., assignors to Schwarz Bioresearch, Inc., Orangeburg, N.Y.
No Drawing. Filed June 24, 1964, Ser. No. 377,487
6 Claims. (Cl. 260—112.5)

This invention has to do with liquid, aqueous cuprous compositions and the formation of cuprous salts of the corresponding sulfhydryl compounds. The invention is particularly concerned with the recovery of sulfhydryl compounds from biological extracts containing the same.

In the preparation of naturally occurring sulfhydryl compounds, such as cysteine, coenzyme A, or glutathione, it is first necessary to extract these substances in aqueous solution from their sources which may be animal tissues, plant material or microorganisms. After extraction, usually in dilute aqueous solution, these compounds are removed from solution by adsorption onto carbon or ion exchange columns, or by precipitation with metal ions.

One of the best precipitating agents for sulfhydryl compounds is the cuprous ion. This metallic ion has the advantage of almost specifically precipitating sulfhydryl compounds quantitatively from dilute, slightly acid, aqueous extracts of naturally occurring materials leaving most of the impurities behind in solution. The highly pure cuprous precipitate can then be filtered, washed, decomposed with hydrogen sulfide to liberate the desired sulfhydryl compound and to form cuprous sulfide, cuprous sulfide removed by filtration, and the pure sulfhydryl compound precipitated in crystalline form by addition of an organic solvent to the concentrate. However, difficulties are encountered in using inorganic cuprous componds, such as cuprous chloride, cuprous oxide or cuprous sulfite, to precipitate sulfhydryl substances from dilute solution. These cuprous compounds are insoluble in neutral or slightly acidic aqueous solutions. Therefore, to precipitate insoluble cuprous sulfhydryl compounds from solution, a reaction involving two insoluble substances must occur. Usually this kind of reaction is slow. Furthermore, a strange phenomena involving reactions between cuprous ions and sulfhydryl compounds readily takes place. A stoichiometric amount of cuprous ions will precipitate an insoluble cuprous sulfyhydryl compound; but, if a 5 to 10% excess above the stoichiometric requirement is used, then, the insoluble sulfhydryl compound redissolves and large losses in yield of the desired compound occur.

In all cases it is important to use freshly prepared wet inorganic cuprous salts for reaction with sulfhydryl substances, because drying and prolonged exposure to air causes oxidation of the cuprous to the cupric form, and the cupric inorganic salts readily oxidize sulfhydryl compounds (RSH) to their oxidized form (R-S-S-R) with large losses in yield of the desired reduced from (RSH). The exact solid measurement of a wet cake of cuprous salt is difficult, and often either more or less than the stoichiometric quantities of the insoluble inorganic cuprous salt is added to the dilute natural extract. Quantities of cuprous salt above and below the stoichiometric requirements appreciably reduce the final yield of sulfhydryl product.

The present invention involves novel cuprous compositions which are free from the disadvantages mentioned above.

It is an object of the present invention, therefore, to provide liquid, aqueous cuprous compositions. Another object of the invention is to provide liquid, aqueous cuprous compositions adapted to be used in accurate and measurable quantities. Still another object is to provide liquid, aqueous cuprous compositions in an inert atmosphere. A further object is to provide a process for forming cuprous salts of sulfhydryl compounds. Another object is the provision of a process for precipitating sulfhydryl compounds in the form of their corresponding cuprous salts from aqueous solutions containing the same. Another object is the provision of a soluble cuprous composition suitable for precipitating sulfhydryl compounds at advantageous pH values, particularly at 3 to 4. A particular object is the provision of a process for recovering sulfhydryl compounds from biological extracts containing the same. A specific object is the recovery of glutathione from biological extracts. Another object is to provide a novel cuprous complex of a cuprous halide. A further object is the preferential extraction of an unsaturated hydrocarbon from a hydrocarbon mixture containing the same and at least one other hydrocarbon. Other objects of the invention will be apparent from the following description.

The compositions of this invention comprise a cuprous complex of a cuprous halide and hydroxylamine. Complexes so defined are stable at temperatures of up to about 80° C., at atmospheric pressure (760 mms.), and are suitable for use at such temperatures; however, higher temperatures with superatmospheric pressures can be employed.

The complexes of this invention can be designated broadly as cuprous complexes of hydroxylamine. The extract nature of the complexes is unknown at this time; however, the most probable chemical representation appears to be

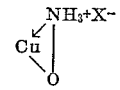

wherein X is halogen.

By way of illustration, a complex of cuprous chloride and hydroxylamine is soluble in: water; methyl, ethyl, propyl and butyl alcohols; acetone, and dimethylformamide. In sharp contrast, cuprous chloride is substantially or completely insoluble in each of such solvents.

The liquid, aqueous cuprous compositions contemplated herein are formed, preferably, by reaction of a hydroxylamine hydrohalide and a basic cupric carbonate in water at a temperature of from about 40° C. to about 80° C. Since the cuprous compositions are stable at temperatures of up to about 80° C., at atmospheric pressure (760 mms.), they are suitable for use at such temperatures unless superatmospheric pressures are employed.

While all hydroxylamine hydrohalides are useful in forming the new compositions, hydroxylamine hydrochloride is preferred. Correspondingly, all basic copper carbonates are suitable; however, $CuCO_3 \cdot Cu(OH)_2$ is preferred.

For each molar proportion of basic copper carbonate, from about 10 to about 20, and preferably 14 to 18, molar proportions of hydroxylamine hydrohalide are used.

Sufficient water is used to dissolve the hydroxylamine hydrohalide and the basic cupric carbonate.

As indicated, reaction temperatures employed in forming the new compositions range from about 40° C. to about 80° C. The preferred range is 60° C. to 80° C. Generally, reaction time will vary between about 0.1 to about 0.5 hour with such reaction temperatures.

Sulfhydryl compounds—RSH, wherein R represents an organic moiety—are broadly contemplated herein. Aliphatic, aromatic, cycloaliphatic, heterocyclic and naturally occurring compounds are included, such for example as: methyl mercaptan, dodecyl mercaptan, benzyl mercaptan, thiophenol, thiophene thiol, glutathione, cysteine, coenzyme A, etc. Particularly suitable herein are the naturally occurring compounds, and especially glutathione.

The naturally occurring sulfhydryl compounds are generally used in the form of biological extracts containing the same. Such extracts are aqueous solutions obtained by extraction with water of animal tissues, plant material, and micro-organisms, and are also obtained by acid hydrolysis of proteins extracted from such living matter.

Not only can naturally occurring sulfhydryl compounds be separated from their biological extracts with the new cuprous compositions, but sulfhydryl compounds generally can be separated from mixtures containing the same. For example, mercaptans can be separated from gaseous and liquid hydrocarbon fractions in which they are present.

The present invention is more fully described and exemplified in the following examples. It is to be understood, however, that the invention is not to be limited to any specific form of materials or conditions set forth in the examples, but is limited solely by the description in the specification and the appended claims. All parts are by weight unless otherwise specified.

Example 1

A soluble cuprous composition is prepared by dissolving 200 grams of hydroxylamine hydrochloride $$(NH_2OH \cdot HCl)$$

in 1 liter of water and heating the same to 80° C. Then, 35 grams of basic cupric carbonate ($CuCO_3:Cu(OH)_2$) are slowly added to the hot hydroxylamine hydrochloride solution until all of the carbonate is dissolved. Carbon dioxide is evolved during the preparation, and the solution is colored faintly yellow. Hydroxylamine is a strong reducing agent and converts the cupric ions to the cuprous form in solution. The temperature is not permitted to rise above 80° C., since, as temperatures of about 90° C. are approached, oxides of nitrogen form. While 200 grams of hydroxylamine serve to keep the resulting cuprous salt in solution, as little as 133 grams may be used if the cuprous solution is to be used hot and at once.

To completely precipitate sulfhydryl compounds from aqueous solution with this soluble cuprous composition, small accurately measured aliquots of the composition are added to a given amount of sulfhydryl solution until a maximum amount of precipitate is formed as shown by centrifugation in graduated tubes. Then, based on the aliquot necessary for optimum results, the amount of soluble composition required for the remainder of the sulfhydryl solution can be calculated. Thus, if 5 ml. of reagent is required for a 100 ml. aliquot of sulfhydryl solution, 500 ml. would be used for 10 liters containing the sulfhydryl compound.

Example 2

1000 kilograms of pressed Baker's yeast were plasmolyzed with a solution containing 5 liters of water, 45 liters of industrial ethyl alcohol (95% ethyl alcohol with 5% methanol), 10 liters of concentrated (96%) sulfuric acid and 40 liters of ethyl acetate. After plasmolysis, the yeast residue so obtained was filtered through a lead press and well washed with 1% sulfuric acid. A clear filtrate of 2080 liters containing 2.2 kilograms of glutathione was obtained. Preliminary tests by aliquot precipitation with soluble cuprous hydroxylamine composition indicated 22.7 liters of this reagent were necessary for optimum precipitation of insoluble cuprous glutathione. One gram atom of cuprous ion in the form of the soluble composition is used for each gram molecule of glutathione content.

A cuprous-hydroxylamine composition was prepared by dissolving 6 kilograms of hydroxlamine hydrochloride in 20 liters of water and the resulting solution was warmed to 80° C. Then, 1050 grams of basic copper carbonate were slowly added, while maintaining the temperature at 80° C., until all of the basic copper carbonate was dissolved and a light yellow solution was formed. Twenty-three liters of this cuprous composition, at about 80° C., were added to the 2080 liters of yeast extract, and the cuprous glutathione which was formed was allowed to settle out overnight. The supernatant solution was now removed and the cuprous glutathione filtered off on a lead press and washed with water until the wash was colorless. The white cake of cuprous glutathione was removed from the press, mixed with a small amount of water to form a suspension and decomposed with $H_2S$. Then, the insoluble cuprous sulfide which was formed was filtered off and washed with water. About 20 liters of filtrate were collected and immediately concentrated under a nitrogen atmosphere to about 8 liters of solution, and treated with 10 liters of ethyl alcohol to permit the glutathione to crystallize out. A yield of 1440 grams of pure glutathione was obtained. This is 52% of the amount in the yeast.

Example 3

The superiority of using a soluble cuprous composition, such as shown in Example 1, over insoluble cuprous sulfite for recovering glutathione from the same size batches of Baker's yeast, is demonstrated with the following tabulated results in Table I. In this comparison, the only salient difference was in the use of a soluble cuprous composition in place of insoluble cuprous sulfite.

TABLE I.—YEAST BATCH SIZE—1,000 KG.

| Batch No. | Grams Glutathione Isolated  | |
|---|---|---|
| | A. Insoluble Cuprous Sulfite | B. Soluble Cuprous Composition |
| 1 | 1,206 | 1,400 |
| 2 | 1,062 | 1,730 |
| 3 | 608 | 1,447 |
| 4 | 740 | 1,295 |
| 5 | 845 | 1,444 |
| 6 | 860 | 1,593 |
| Average Yield Per Batch | 887 | 1,485 |

Use of the soluble cuprous hydroxylamine reagent results in a 67% higher yield of the sulfhydryl compound, glutathione.

Example 4

A solution containing 1% cysteine hydrochloride is treated with a cuprous-hydroxylamine composition as described in Example 1 according to the procedure described in Example 2, until precipitation of cuprous cysteine is complete. The precipitate is well washed with water and is decomposed with $H_2S$ in a 0.1 N hydrochloric acid solution. Filtrate and wash are concentrated to dryness and the residue is recrystallized from 5 N HCl to yield pure crystalline cysteine hydrochloride.

Example 5

A 0.1% solution of coenzyme A is treated with a cuprous-hydroxylamine composition as described in Example 1 according to the procedure described in Example 2, until precipitation of cuprous-coenzyme A is complete. The precipitate is well washed with water and is decomposed with $H_2S$. Then, the copper sulfide which is formed is filtered off and the filtrate so obtained is concentrated to a syrup and the latter treated with 2 volumes of alcohol to precipitate reduced coenzyme A.

Although hydrogen sulfide has been shown to be a convenient and, in fact, preferred acid for liberating a sulfhydryl compound from its corresponding copper salt, the hydrogen form of cation exchange resins can also be used for this purpose. Thus, a suspension of an insoluble cuprous sulfhydryl compound in water is mixed with such a resin, whereupon copper is transferred from the compound to the resin and the sulfhydryl compound is liberated and solubilized. Generally, an acid suitable for liberating a sulfhydryl compound from its corresponding copper salt is one whose cuprous salt has a solubility product substantially the same or less than the solubility product of the cuprous sulfhydryl compound.

Example 6

An aqueous cuprous-hydroxylamine composition prepared as described in Example 1 was evaporated at 25–30° C. at 15 millimeters pressure, whereupon water was removed and a crystalline solid was obtained. The solid was extracted with methanol to obtain a methanol extract containing a cuprous chloride-hydroxylamine complex and hydroxylamine. The latter was separated from the extract by filtration. The evaporation and filtration steps were repeated twice again, and the product obtained was a solution of the anhydrous complex in methanol.

The soluble cuprous compositions of this invention are advantageous for other uses, in addition to their use with sulfhydryl compounds. They are characterized by forming almost completely insoluble cuprous salts with acetylenes and having high capacity for absorbing olefins, while having low solvent power for paraffins. They can be used to preferentially separate an acetylene or an olefin, particularly an olefin of 2 to 6 carbon atoms per molecule, from a hydrocarbon mixture containing such an acetylene and/or an olefin and at least one other hydrocarbon such as a paraffin. The mixture and a soluble cuprous composition of this invention can be contacted with each other for a sufficient period of time for an acetylene to react with the cuprous composition or for an olefin to be absorbed by such a composition. The acetylene reaction product can be separated as a solid. An extract phase containing the olefin can be separated from a raffinate phase, and the olefin can be recovered from the extract phase as by heating of the same.

While the invention has been described in detail according to preferred compositions, methods and conditions for using the same, it will be obvious to those skilled in the art that changes and modifications can be made, without departing from the spirit or scope of the invention, and it is intended in the appended claims to cover such changes and modifications.

We claim:
1. The process for forming a cuprous salt of a sulfhydryl compound, which comprises: contacting a sulfhydryl compound with a complex of a cuprous halide and hydroxylamine at a temperature below about 80° C.
2. The process defined by claim 1 wherein the halide is chloride.
3. The process for forming a cuprous salt of a sulfhydryl compound, which comprises: contacting an aqueous solution containing a sulfhydryl compound with an aqueous composition containing a complex of a cuprous halide and hydroxylamine, at a temperature below about 80° C.
4. The process for precipitating a sulfhydryl compound in the form of its corresponding cuprous salt from an aqueous solution containing the same, which comprises: contacting said aqeuous solution with a liquid aqueous composition containing a complex of a cuprous halide and hydroxylamine, at a temperature below about 80° C.
5. The process defined by claim 4 wherein the halide is chloride.
6. The process for precipitating glutathione from a biological extract containing the same, which comprises: contacting said extract with a liquid aqueous composition containing a complex of cuprous chloride and hydroxylamine, at a temperature below about 80° C.

References Cited
UNITED STATES PATENTS

| | | | |
|---|---|---|---|
| 2,349,820 | 5/1944 | Fox | 252—43 |
| 2,407,265 | 9/1946 | Fox | 260—438.1 |
| 2,407,266 | 9/1946 | Fox | 260—438.1 |
| 2,414,035 | 1/1947 | Fox | 260—438.1 |
| 2,975,200 | 3/1961 | Warner | 260—438.1 |
| 3,206,465 | 9/1965 | Reifschneider | 260—299 |
| 3,206,466 | 9/1965 | Reifschneider | 260—299 |
| 3,206,467 | 9/1965 | Reifschneider | 260—302 |
| 3,281,407 | 10/1966 | Dalby | 260—112.5 |
| 2,209,299 | 7/1940 | Schoeller et al. | 260—534 |
| 2,376,186 | 5/1945 | Rapkine | 260—534 |
| 2,653,074 | 9/1953 | Blaker | 8—55 |
| 2,702,799 | 2/1955 | Laufer et al. | 260—112 |

References Cited

Mellor: Comprehensive Treatise on Inorganic and Theoretical Chemistry, vol. III, Longmans, Green and Co., London (1923), p. 256.

LEWIS GOTTS, *Primary Examiner.*

M. M. KASSENOFF, *Assistant Examiner.*